US008654516B2

(12) United States Patent
Chang

(10) Patent No.: US 8,654,516 B2
(45) Date of Patent: Feb. 18, 2014

(54) POWER SUPPLY FOR COMPUTER

(75) Inventor: Chin-Ming Chang, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 795 days.

(21) Appl. No.: 12/884,206

(22) Filed: Sep. 17, 2010

(65) Prior Publication Data

US 2012/0019998 A1 Jan. 26, 2012

(30) Foreign Application Priority Data

Jul. 21, 2010 (TW) .................................. 99123894

(51) Int. Cl.
*H05K 5/00* (2006.01)
*H05K 7/00* (2006.01)
*G06F 1/16* (2006.01)

(52) U.S. Cl.
USPC .................................. 361/679.02; 361/679.6

(58) Field of Classification Search
USPC ................. 361/679.02, 679.4, 679.6, 679.37, 361/679.38, 679.39, 724, 725, 726, 727
See application file for complete search history.

(56) References Cited

U.S. PATENT DOCUMENTS

| | | | | |
|---|---|---|---|---|
| 5,612,854 A | * | 3/1997 | Wiscombe et al. | 361/727 |
| 5,790,372 A | * | 8/1998 | Dewey et al. | 361/679.58 |
| 5,790,374 A | * | 8/1998 | Wong | 361/679.32 |
| 5,930,110 A | * | 7/1999 | Nishigaki et al. | 361/679.43 |
| 6,885,558 B2 | * | 4/2005 | Yokote et al. | 361/732 |
| 6,906,918 B2 | * | 6/2005 | Rabinovitz | 361/679.48 |
| 8,089,759 B2 | * | 1/2012 | Sun | 361/679.58 |

* cited by examiner

*Primary Examiner* — Anthony Haughton
(74) *Attorney, Agent, or Firm* — Altis Law Group, Inc.

(57) ABSTRACT

An exemplary computer includes a computer case, a first power conversion device mounted at a first position in the computer case, and a second power conversion device separate from and electrically connected with the first power conversion device. The first power conversion device converts external AC power to a first DC voltage and outputs the first DC voltage to the second power conversion device. The second power conversion device is mounted at a second position separate from the first position in the computer case. The second power conversion device converts the first DC voltage to at least one second DC voltage and outputs the at least one second DC voltage.

12 Claims, 4 Drawing Sheets

POWER SUPPLY FOR COMPUTER

BACKGROUND

1. Technical Field

The disclosure generally relates to power supplies, and particularly to a power supply for a computer.

2. Description of Related Art

Power supplies in computers convert external AC (alternating current) voltage into DC (direct current) voltages applicable to electronic components in the computer. Such electronic components include, for example, a central processing unit (CPU) and a hard disk drive. The power supply often includes a casing, and a first power conversion circuit and a second power conversion circuit accommodated in the casing. During operation, the first power conversion circuit converts the external AC voltage into a first DC voltage and outputs the first DC voltage to the second power conversion circuit, and the second power conversion circuit converts the first DC voltage into a plurality of second DC voltages and outputs the second DC voltages to the electronic components of the computer.

However, the first power conversion circuit and second power conversion circuit are often mounted together, increasing a volume of the power supply, and compromising manufacturing efforts toward more compact computers. In addition, during testing of the power supply, if a second DC voltage deviates from a predetermined value, it cannot be readily ascertained whether the problem is in the first power conversion circuit or the second, unless the power supply is disassembled. Yet disassembling the power supply causes considerable inconvenience.

Accordingly, what is needed is a power supply which can overcome the limitations described.

BRIEF DESCRIPTION OF THE DRAWINGS

Many aspects of the embodiment(s) can be better understood with reference to the following drawings. The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
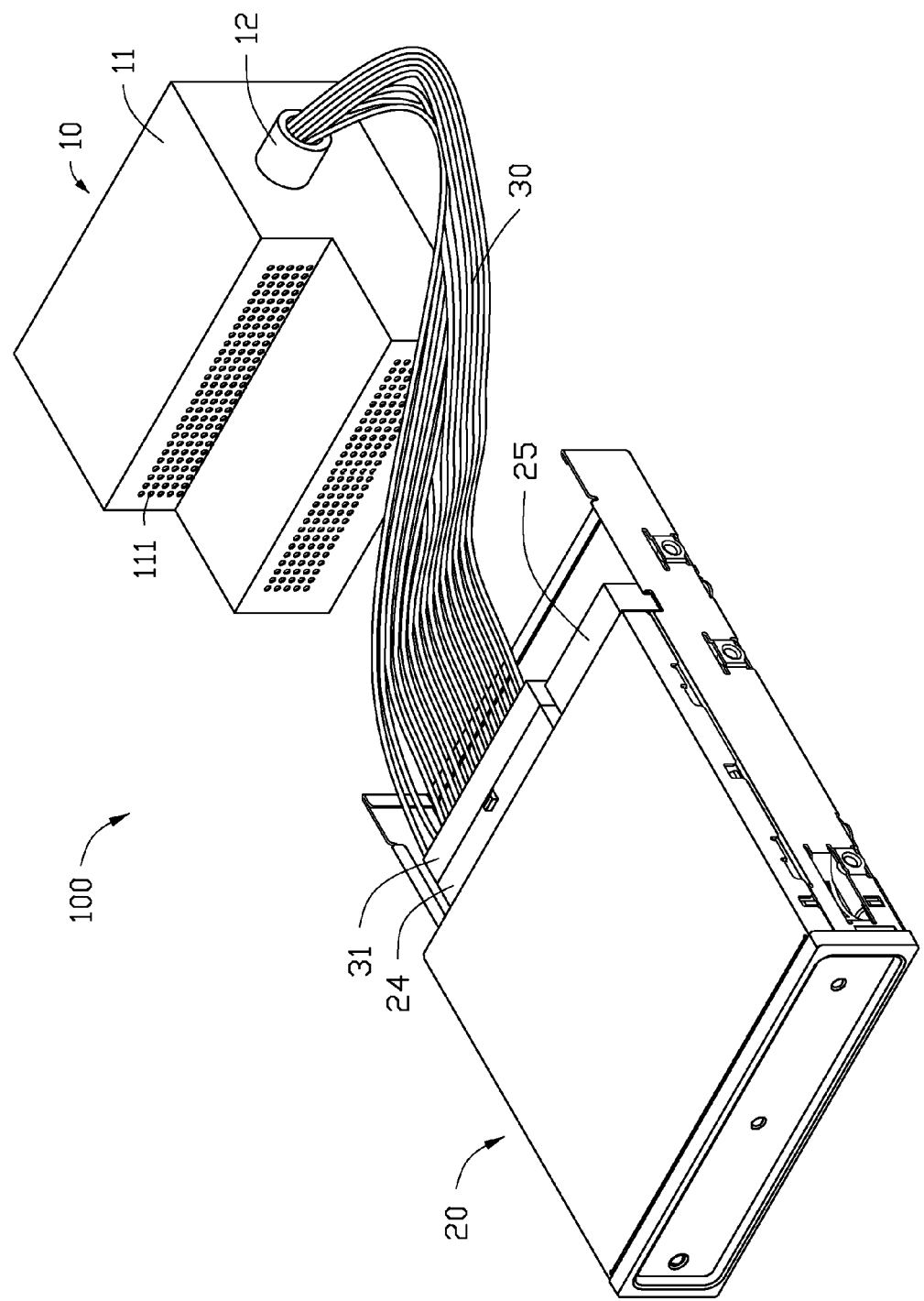
FIG. 1 is an isometric, assembled view of a power supply in accordance with an exemplary embodiment of the present disclosure.
Figure 4:
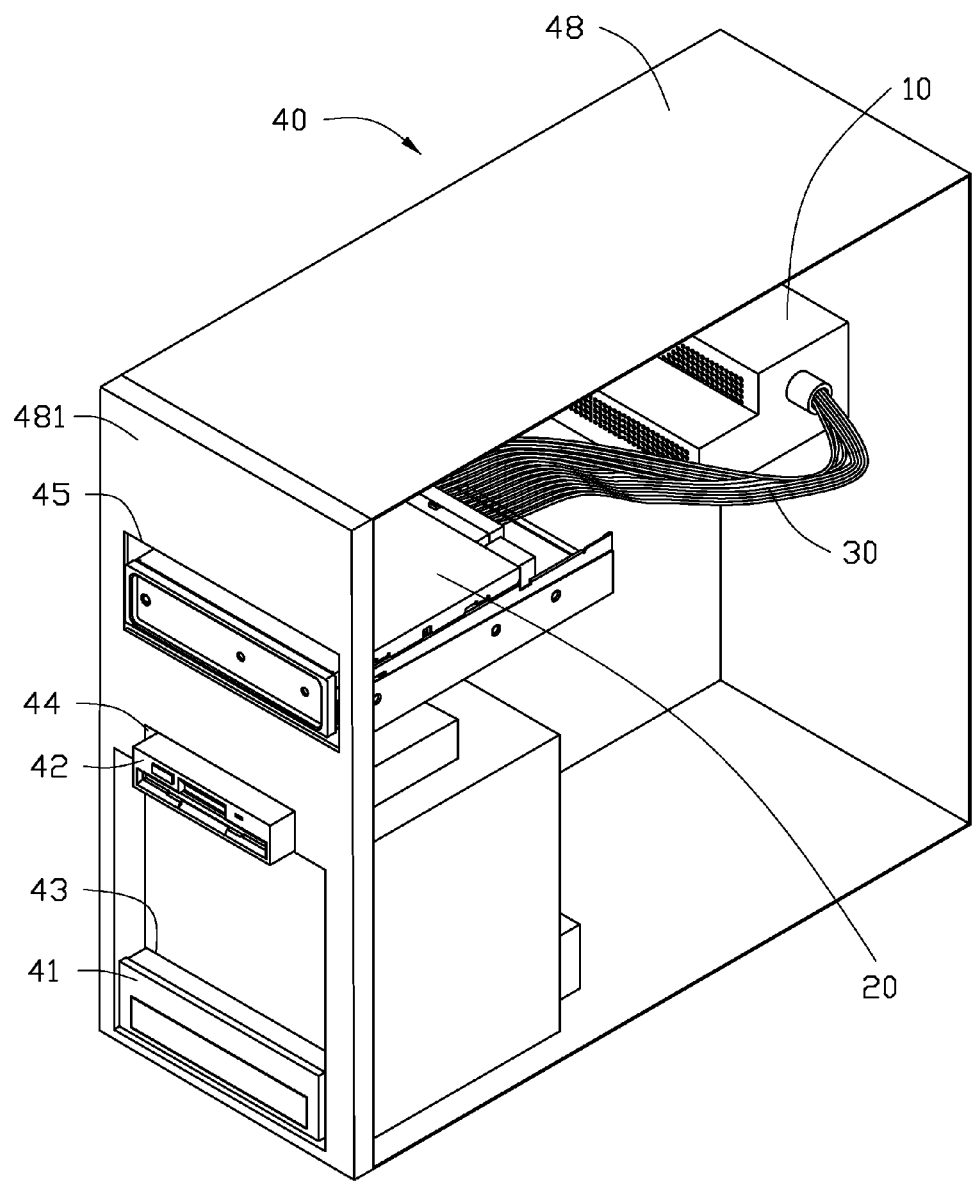
FIG. 4 shows the power supply of FIG. 1 accommodated in a computer.

Referring to FIG. 1, a power supply 100 according to an exemplary embodiment of the present disclosure is shown. The power supply 100 includes a first power conversion device 10, a second power conversion device 20 separate from the first power conversion device 10, and a cable 30 interconnecting the first power conversion device 10 and the second power conversion device 20. Referring to FIG. 4, the power supply 10 is typically used in a computer case 48 of a computer 40 to supply power to a hard disk drive 41, a floppy disk drive 42, and a central processing unit (CPU, not shown), or to other electronic components of the computer 40.

The first power conversion device 10 converts external AC power into a first DC voltage, and outputs the first DC voltage to the second power conversion device 20 through the cable 30. The first power conversion device 10 includes a step-shaped hollow casing 11, housing a first power conversion circuit (not shown) therein. A connecting conduit 12 protrudes from a side plate of the casing 11. One end of the cable 30 is connected with the first power conversion circuit of the first power conversion device 10 through the connecting conduit 12, and another end of the cable 30 is detachably connected with the second power conversion device 20 through an insert connector 31. The casing 11 defines a plurality of heat dissipation holes 111 therein, and a heat dissipation fan (not shown) can be used in the first power conversion device 10 to promote the heat dissipation capability of the first power conversion device 10.

Figure 2:
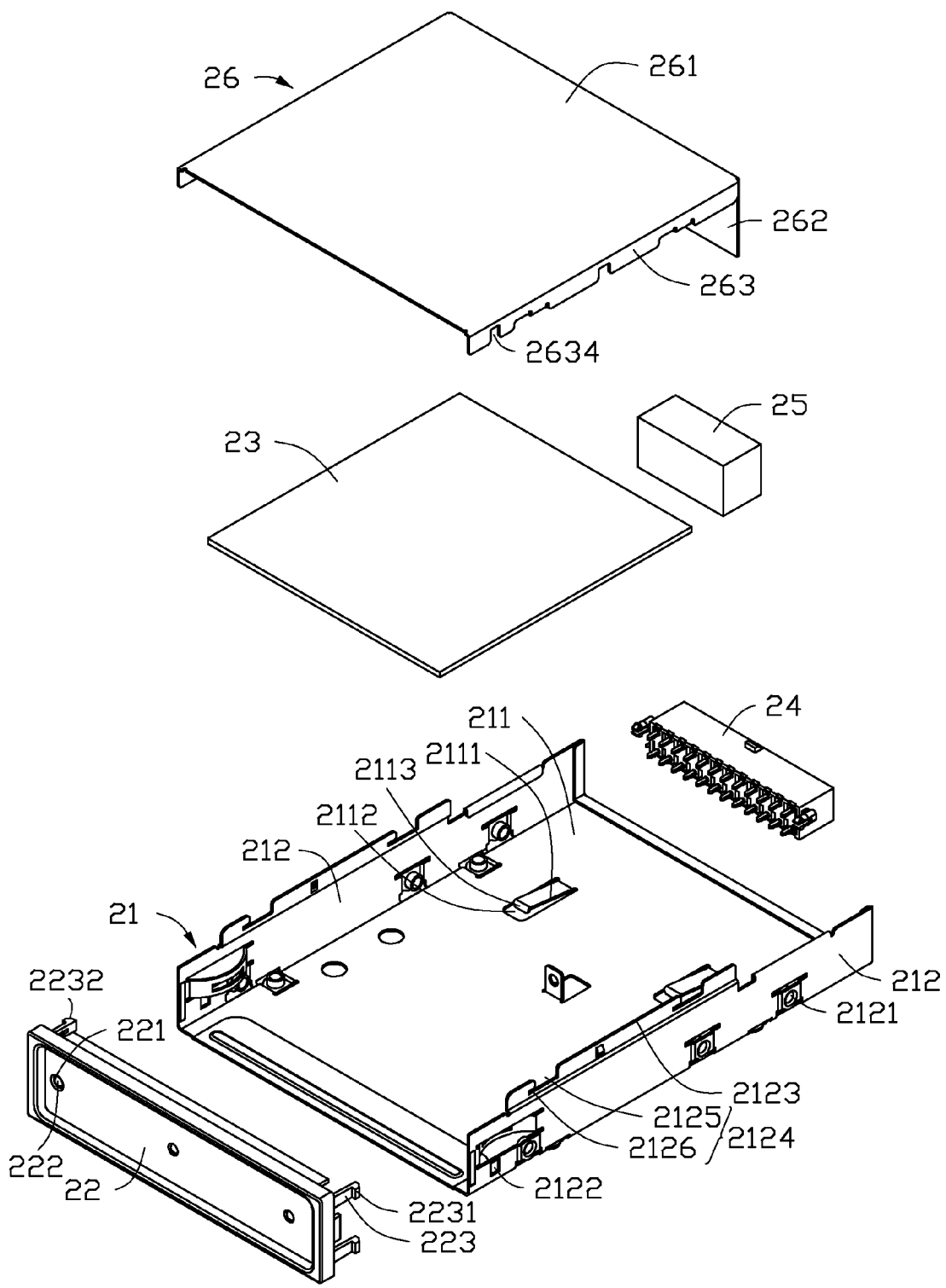
FIG. 2 is an isometric, exploded view of a second power conversion device of the power supply of FIG. 1.

Referring to FIG. 2 and FIG. 4, the second power conversion device 20 converts the first DC voltage into a second DC voltage, a third DC voltage and a fourth DC voltage, and outputs the second, third and fourth DC voltages. Each of the second, third and fourth DC voltages has a voltage value less than the first DC voltage. The second power conversion device 20 is rectangular (or parallelepiped), and of a size corresponding to a first receiving bay 43 or a second receiving bay 44 for disk drives 41, 42 in the computer 40. The first and second receiving bays 43, 44 are defined in a front panel 481 of the computer case 48 for receiving the disk drives 41, 42 therein. When either of the disk drives 41, 42 is not present in the corresponding receiving bay 43, 44, the second power conversion device 20 can be mounted in the vacant receiving bay 43 or 44. Alternatively, as illustrated in this embodiment, the second power conversion device 20 can be mounted in a third receiving bay 45 defined in the front panel 481 of the computer case 48 above the first and second receiving bays 43, 44, wherein the third receiving bay 45 is originally intended to receive another hard disk drive therein. The second power conversion device 20 includes a bottom frame 21, a panel 22 mounted at a front of the frame 21, a second power conversion circuit 23 mounted in the frame 21, an input connector 24 and an output connector 25 mounted at a rear of the frame 21, and a top cover 26 mounted on the frame 21.

The frame 21 includes a base plate 211, and two side plates 212 respectively extending upwardly from right and left lateral sides of the base plate 211. Two resilient tabs 2111 are punched upwardly from the base plate 211, and correspondingly, two elongated punching holes 2112 are defined respectively below the two resilient tabs 2111. Each resilient tab 2111 extends obliquely up from the base plate 211 inside the frame 21. A free end of the resilient tab 2111 extends downwardly towards the base plate 211 to form an abutting flange 2113. Each side plate 212 defines a plurality of mounting holes 2121 therein. The mounting holes 2121 are provided for mounting of the second power conversion device 20 in the third receiving bay 45 of the computer 40. A latching hole 2122 is defined in a front side of the side plate 212 adjacent to the panel 22. A top of each side plate 212 away from the base plate 211 of the frame 21 extends upwardly to form a first mounting flange 2123. The first mounting flange 2123 defines two L-shaped latching slots 2124 therein. Each latching slot includes a first slot section 2125 spanning down from a top of the first mounting flange 2123 towards the base plate 211, and a second slot section 2126 spanning from a bottom of the first slot section 2125 towards the front side of the side plate 212.

The panel 22 is a rectangular plate, defining three receiving holes 221 therein, each receiving an indicator light 222 therein. Four latching arms 223 respectively extend from four corners of the panel 22 towards the frame 21. A free end of each latching arm 223 extends outwardly to form a latching block 2231. A sliding surface 2232 is provided on the latching block 2231. The sliding surface 2232 faces toward an outside of the panel 22 in an oblique direction.

The second power conversion circuit 23 is electrically connected with the input connector 24, the output connector 25 and the indicator lights 222 of the panel 22. The second power conversion circuit 23 is electrically connected with the first power conversion device 10 through the input connector 24, the insert connector 31 and the cable 30, wherein the insert connector 31 is engaged in the input connector 24. The second power conversion circuit 23 converts the first DC voltage to the second DC voltage, the third DC voltage and the fourth DC voltage, and outputs the second, third, and fourth DC voltages through the output connector 25. The indicator lights 222 of the panel 22 indicate output states of the output voltages.

The cover 26 includes a top plate 261, an abutting plate 262 depending from a rear side of the top plate 261, and two second mounting flanges 263 depending from left and right lateral sides of the top plate 261.

Figure 3:
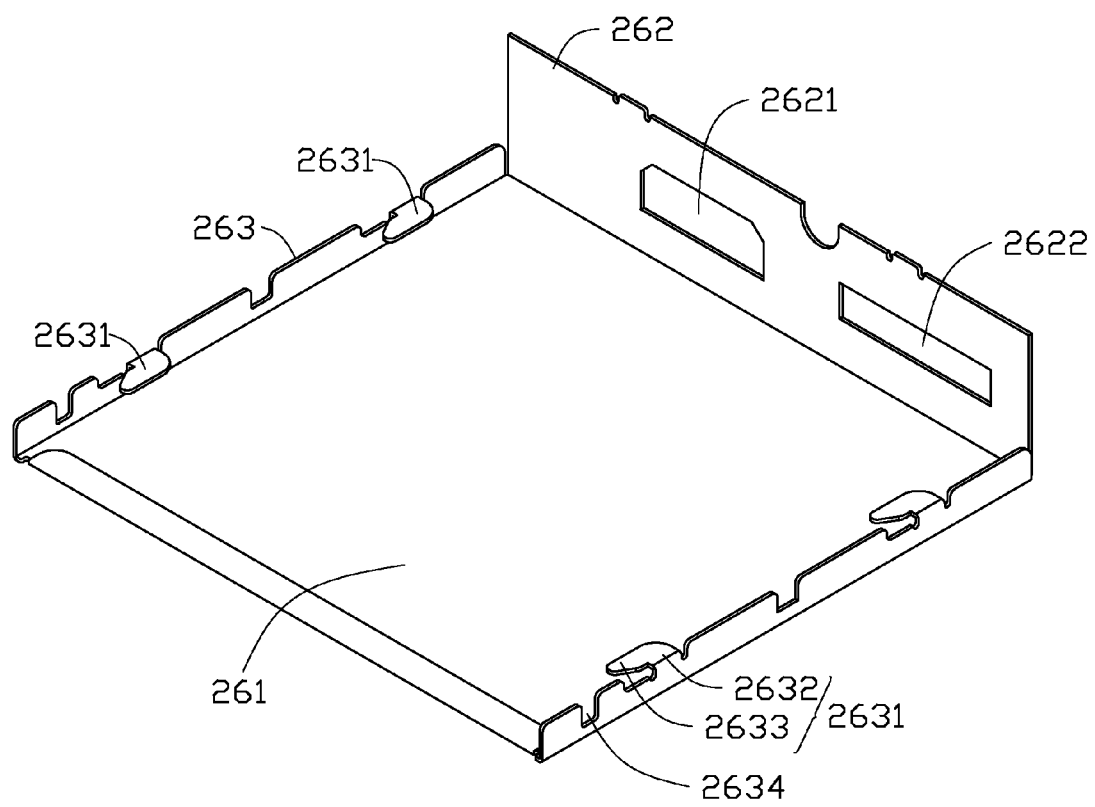
FIG. 3 is an isometric view of a cover of the second power conversion device of FIG. 2, showing the cover inverted.

Referring to FIG. 3, the abutting plate 262 defines a first through hole 2621 and a second through hole 2622 therein. The input connector 24 is mounted at the second through hole 2622, and is electrically connected with the second power conversion circuit 23 through the second through hole 2622. The output connector 25 is mounted at the first through hole 2621, and is electrically connected with the second power conversion circuit 23 through the first through hole 2621. Each second mounting flange 263 is provided with two latching hooks 2631 protruding inwardly from a bottom thereof. Each latching hook 2631 includes a neck portion 2632 extending from the bottom of the second mounting flange 263 towards an inside of the cover 26, and a hooking portion 2633 extending from a free end of the neck portion 2632 in a direction generally away from the abutting plate 262. A mounting cutout 2634 is defined in the top of the second mounting flange 263 distant from the abutting plate 262.

In assembly of the second power conversion device 20, the neck portion 2632 of each latching hook 2631 of the cover 26 is disposed in the first slot section 2125 of a corresponding latching slot 2124 of the frame 21, and the abutting plate 262 is disposed on the resilient tab 2111 of the frame 21. The cover 26 is pushed toward or along the frame 21 to cause the abutting plate 262 to abut the resilient tabs 2111, which deform accordingly; and the cover 26 is pushed toward the front side of the frame 21 to slide the neck portion 2632 of each latching hook 2631 into the second slot section 2126 of the corresponding latching slot 2124. At the same time, the abutting plate 262 slides along the resilient tabs 2111 until it has completely passed over the resilient tabs 2111. Accordingly, the hooking portion 2633 of each latching hook 2631 of the cover 26 hooks on an inner surface of the first mounting flange 2123 of the frame 21; and the resilient tabs 2111 rebound to abut an outside face of the abutting plate 262 of the cover 26, to prevent movement of the cover 26 relative to the frame 21. The panel 22 is mounted at the front of the frame 21 and the cover 26 by the four latching arms 223 being received in the frame 21 until the latching blocks 2231 of the latching arms 223 are respectively received in the latching holes 2122 of the side plates 212 of the frame 21 and the latching cutouts 2643 of the second mounting flange 263 of the cover 26.

In the embodiment disclosed, the power supply 100 includes a first power conversion device 10 and a second power conversion device 20 separate from each other. Each of the first and second power conversion devices 10, 20 is smaller than a conventional bulky power supply. This means the first power conversion device 10 and the second power conversion device 20 can be mounted in different positions in the computer 40, even when the space available in the computer 40 is too small for accommodating a conventional bulky power supply. As shown in FIG. 4, the first power conversion device 10 of the power supply 100 is mounted at a rear of the computer 40, and the second power conversion device 20 is mounted in the third receiving bay 45 at the front of the computer 40. Thus, the limited space available in the computer 40 is optimally utilized by employing the power supply 100. In addition, during testing of the power supply 100, the first power conversion device 10 and the second power conversion device 20 can be tested separately, allowing specific origins of detected malfunctions to be easily found.

It is to be understood, however, that even though numerous characteristics and advantages of the present embodiments have been set forth in the foregoing description, together with details of the structures and functions of the embodiments, the disclosure is illustrative only, and that changes may be made in detail, especially in matters of shape, size, and arrangement of parts within the principles of the embodiments to the full extent indicated by the broad general meaning of the terms in which the appended claims are expressed.

What is claimed is:

1. A power supply for a computer, the power supply comprising:
    a first power conversion device configured for converting external alternating current (AC) power to a first direct current (DC) voltage; and
    a second power conversion device separate from and electrically connected to the first power conversion device, the second power conversion device configured for converting the first DC voltage into at least one second DC voltage and outputting the at least one second DC voltage;
    wherein the first power conversion device is electrically connected with the second power conversion device through a cable to which at least one of the first power conversion device and the second conversion device is detachably connected.

2. The power supply of claim 1, wherein the first power conversion device comprises a casing, from a side plate of which a connecting conduit protrudes, one end of the cable is electrically connected with the first power conversion device through the connecting conduit and another end of the cable is detachably connected with the second power conversion device.

3. The power supply of claim 1, wherein the second power conversion device comprises a frame and a cover attached thereon, the frame comprising a base plate and two side plates formed at two opposite sides of the base plate, a plurality of resilient tabs formed on the base plate, each of the side plates defining a plurality of latching slots therein, the cover comprising a top plate and an abutting plate formed at a side of the top plate, and wherein a plurality of latching hooks is formed on the top plate corresponding to the latching slots of the frame, the latching hooks are respectively received in the latching slots, and the abutting plate of the cover abuts the resilient tabs of the frame.

4. The power supply of claim 3, wherein each of the resilient tabs extends obliquely from the base plate towards an inside of the frame, an abutting flange is formed at a free end of the resilient tab, and the abutting plate abuts the abutting flange of the resilient tab.

5. The power supply of claim 3, wherein the latching slot comprises a first slot section and a second slot section, the latching hook of the cover comprises a neck portion and a hooking portion extending from a free end of the neck portion, the neck portion of the latching hook is received in the latching slot from the first slot section of the latching slot and is slideable along the second slot section, and the hooking portion of the latching hook hooks on the side plate of the frame.

6. The power supply of claim 3, wherein an input connector and an output connector are coupled to the frame, the other end of the cable is detachably connected with the input connector through an insert connector, and the at least one second DC voltage is output from the second power conversion device through the output connector.

7. The power supply of claim 3, wherein the frame further comprises a panel on which at least one indicator light is mounted, indicating an output status of the at least one second DC voltage.

8. The power supply of claim 7, wherein a plurality of latching arms extends outwardly from the panel towards the frame, a latching block is formed at a free end of each of the latching arms, and the side plate of the frame defines at least one latching hole therein, and the latching blocks of the latching arms are respectively received in the at least one latching hole.

9. A computer comprising:
a computer case;
a first power conversion device mounted at a first position in the computer case, wherein the first power conversion device is configured for converting external alternating current (AC) power to a first direct current (DC) voltage; and
a second power conversion device separate from and electrically connected with the first power conversion device through a cable, wherein the second power conversion device is mounted at a second position different from the first position in the computer case, and is configured for converting the first DC voltage into at least one second DC voltage and outputting the at least one second DC voltage;
wherein one end of the cable is electrically connected with one of the first power conversion device and the second power conversion device, and the other end of the cable is detachably connected with the other one of the first power conversion device and the second power conversion device.

10. The computer of claim 9, wherein the second power conversion device comprises a frame and a cover attached on the frame, the frame comprising a base plate and two side plates formed at two opposite sides of the base plate, a plurality of resilient tabs on the base plate and angling from the base plate towards an inside of the frame, and wherein the cover comprises a top plate and an abutting plate formed at a side of the top plate, and the abutting plate of the cover abuts the resilient tabs of the frame to restrict movement of the cover relative to the frame.

11. The computer of claim 9, wherein the computer case defines a plurality of receiving bays in a front panel for receiving disk drives therein, in one of which the second power conversion device is received.

12. A computer comprising:
a computer case defining a plurality of receiving bays in a front panel for receiving disk drives therein;
a first power conversion device mounted at a first position in the computer case, wherein the first power conversion device is configured for converting external alternating current (AC) power to a first direct current (DC) voltage; and
a second power conversion device separate from and electrically connected with the first power conversion device through a cable, wherein the second power conversion device is received in one of the receiving bays and mounted at a second position different from the first position in the computer case, and is configured for converting the first DC voltage into at least one second DC voltage and outputting the at least one second DC voltage.

* * * * *